Oct. 11, 1960

R. W. HUSHER 2,955,454

TORQUE WRENCH TESTER

Filed Nov. 5, 1956

INVENTOR.
RICHARD W. HUSHER
BY
ATTORNEY

Oct. 11, 1960     R. W. HUSHER     2,955,454
TORQUE WRENCH TESTER

Filed Nov. 5, 1956     3 Sheets-Sheet 2

INVENTOR.
RICHARD W. HUSHER
BY
ATTORNEY

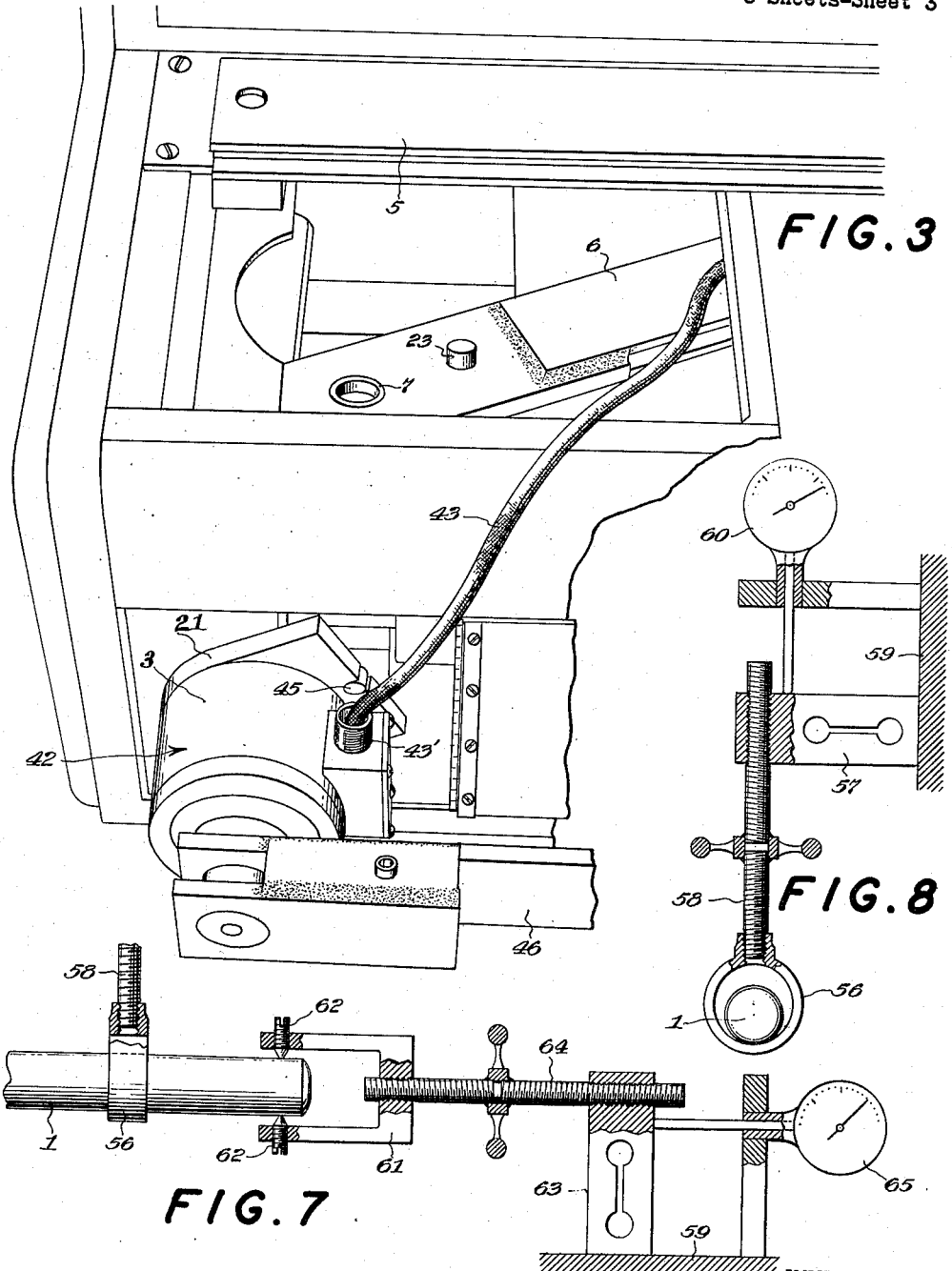

United States Patent Office 2,955,454
Patented Oct. 11, 1960

2,955,454

TORQUE WRENCH TESTER

Richard W. Husher, Newton, Mass., assignor to Baldwin-Lima-Hamilton Corporation, a corporation of Pennsylvania Filed Nov. 5, 1956, Ser. No. 620,423

10 Claims. (Cl. 73—1)

This invention relates to torque wrench testers.

Many types and forms of torque wrench testing apparatus have been proposed and used but the same have been deficient either structurally, functionally or economically. In some instances such devices have been unreliable from the standpoint of accuracy and reproducibility of results, or they have been so constructed that their test load range has been limited thereby requiring separate testing machines for different ranges, all of which added to the overall cost of equipping a shop with an adequate line of apparatus, or they have been so cumbersome as to require excessive space, and finally the ability to calibrate prior testers has been entirely inadequate.

It is an object of my invention to provide an improved torque wrench tester that has a high degree of accuracy and reliability for reproducing testing results; that is relatively simple, compact and rugged in construction, and stable in operation; and that can be readily and accurately calibrated with dead weights without in the slightest way impairing the calibration of the tester when it is used in its normal testing function.

A further object is to provide an improved torque wrench tester employing a torque pickup having electrical strain gage means for sensing the torque.

A further object is to provide such an electrical strain sensitive type of torque tester that is adapted to allow the pickup to be moved from a testing position to a calibrating position, and vice versa, while maintaining the pickup and its instrumentation intact, as a measuring system, thereby to insure not only accurate calibration of the measuring system but also of maintaining that calibration when the tester is placed in normal operation.

Other objects and advantages will be more apparent to those skilled in the art from the following description of the accompanying drawings in which:

Fig. 3 is an enlarged fragmentary perspective showing the torque pickup and calibrating arm;

Fig. 7 is a diagrammatic mechanical arrangement showing the application of an axial load to the torque wrench handle during a testing operating; and Fig. 8 is an enlarged fragmentary section taken substantially on the line 8—8 of Fig. 7, showing the application of a vertical pull on the wrench handle.

Figure 2:
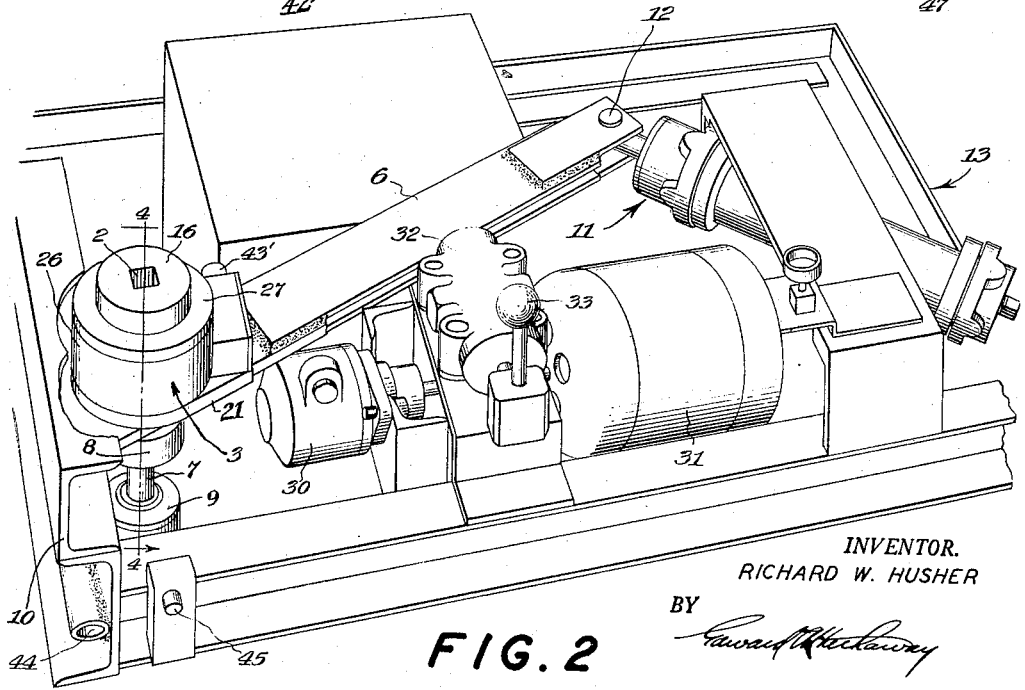
Fig. 2 is a perspective with the tester cabinet removed to show certain operating elements.
Figure 4:
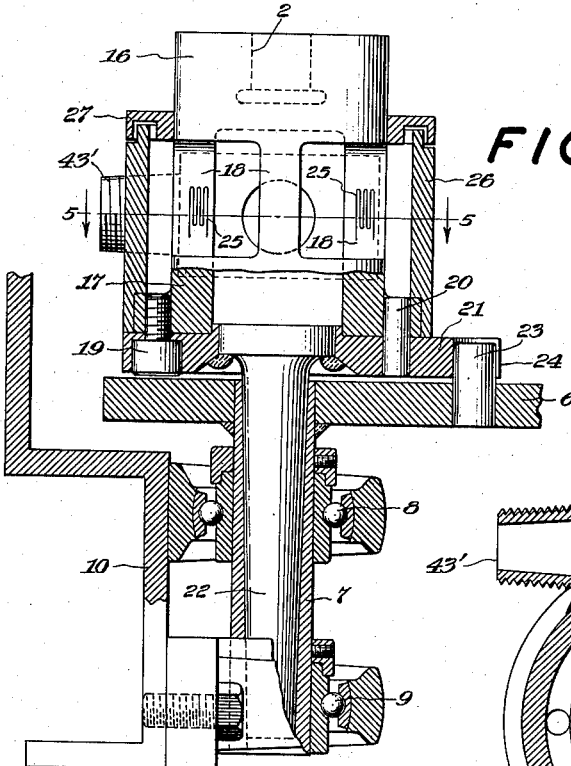
Fig. 4 is a vertical sectional view of the torque pickup in position on the torque producing arm.
Figure 5:
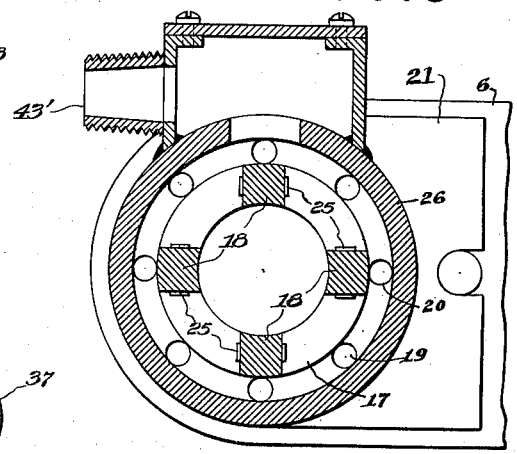
Fig. 5 is a horizontal section taken substantially on the line 5—5 of Fig. 4.

In the drawings I have shown, for purposes of illustration, a torque wrench 1 whose socket end has a usual wrench engaging lug of square cross section to be received in a square recess 2, Fig. 2, of an electrically responsive torque pickup generally indicated at 3 and referred to in the claims hereof as torque responsive means. The wrench handle is supported on a suitable rest 4 at a given marked location on the handle. This rest may be adjusted to any position longitudinally of the handle by being moved along a guideway 5. The torque pickup is supported on a torque arm 6, Fig. 2, which, as shown in Fig. 4, is pivotally supported independently of the torque pickup by being secured to a short tubular locater shaft 7 journalled in a pair of ball bearings 8 and 9, these bearings being secured to an end piece 10 of the tester frame. The other end of the torque arm is operated by a piston and cylinder, generally indicated at 11, whose piston rod is pivotally connected at 12 to the torque arm while the cylinder is suitably pivoted to the other end of the tester frame generally indicated at 13. The wrench handle is held against movement by the rest 4 during testing and torque is transmitted from the torque arm 6 to the socket end of the wrench through the torque pickup 3. To accomplish this, as shown in Fig. 4, the torque pickup comprises upper and lower cylindrical portions 16 and 17 integrally connected by axially extending strain responsive elements 18 which, as shown in Fig. 5, are generally of square cross section. The lower cylinder portion 17 is bolted and doweled as at 19 and 20 to a combined torque transmitting adapter and locater consisting of a plate 21 welded or otherwise suitably secured to tapered locater pin 22 which is received in and complementary to the tapered bore of torque arm shaft 7. A torque transmitting pin 23 is secured in the torque arm and is received in a slot 24 of the adapter plate 21 thereby to transmit torque from the torque arm to the strain sensitive elements 18 which will bend in response to torque when the upper cylinder 16 is prevented from rotating by the wrench under test. Electrical impedance strain responsive means, preferably in the form of bonded wire type strain gages 25, are placed upon the sides of the elements 18 so that the electrical resistance of the strain gages changes in response to torque. A suitable axial cover 26 is secured to the flange of the lower cylinder portion 17 of the torque sensitive element. A radial cover 27 is secured to the upper cylindrical portion 16 but is spaced from the axial cover so as to allow complete freedom from friction upon relative rotation between the upper and lower portions 16 and 17.

To actuate the piston and cylinder 11, a pump 30 is driven by an electric motor 31 while pressure fluid to and from the cylinder 11 is controlled by a valve 32 which is operated by a hand lever 33.

Figure 6:
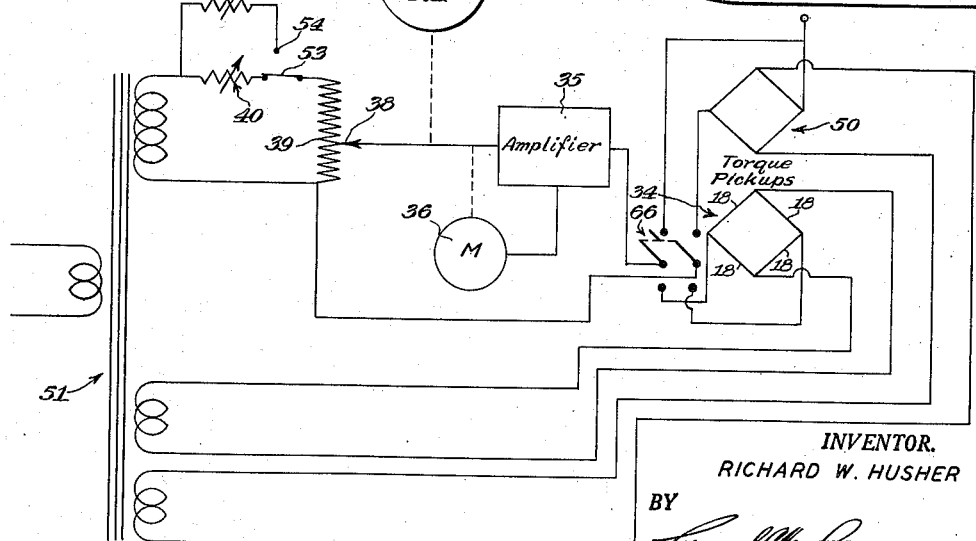
Fig. 6 is a wiring diagram of the torque pickup circuit.

To measure the change in electrical output of the strain gages, they are connected in a suitable Wheatstone bridge, generally indicated at 34, Fig. 6, to which power is supplied in a usual manner and the output signal is transmitted through an amplifier 35 to control a motor 36 which in turn operates a suitable dial 37 graduated in inch pounds of torque or other suitable graduations as may be desired. This instrumentation, if desired, may be of the null balance type having a contact 38 adjusted by motor 36 over a variable resistance such as a slide wire 39. Circuits of this type are well known and, hence, need not be further described in detail except that to adjust the span of the instrument in response to a given strain change an adjustable calibrating resistor 40 is placed in series with the slide wire circuit 39.

Accurate calibration of a torque wrench tester is most essential in order that the tester may be reliable. It is also essential that when the tester is placed in normal operation the calibration should not be impaired in the slightest degree. This problem is particularly acute in electrical sensitive apparatus involving a pickup and measuring instrument, and to insure maximum effectiveness and ease of calibration in such a system I have provided means whereby my torque type load cell may be alternatively positioned either in its normal testing position on the torque arm 6 or in a calibrating position where dead weights may be applied and, at the same time, maintain a single normal operating relationship of the torque pickup to the measuring instrumentation that is common to each position so that the combined system, of pickup and instrument, always has a continuous normal operative relationship that remains intact at all times without any possibility of impairment, thus insuring the very highest degree of calibrating and operating accuracy. To accomplish this the torque pickup with its adapter plate 21 and locater shaft 22 are bodily removable as a unit from the torque arm 6 and it then placed in a horizontal calibrating position 42, Fig. 3, while the lead out cable 43 from the strain gages and extending through a fitting 43′ remains continuously connected to the instrumentation. The tapered shaft 22 is supported in its calibrating position in a horizontal tapered socket 44, Fig. 2. This stationary socket and stationary pin 45 receivable in the recess 24 of the adapted plate are fixed to the tester frame. A calibrating arm 46 disposed in a predetermined position, preferably horizontal, has a square lug to be received in the pickup recess 2, and is provided at its outer end with suitable means 47 to support calibrating weights not shown. Inasmuch as dead weights are the most accurate means for calibration purposes, it is seen that the torque pickup 3 will be subjected to a precise predetermined moment and the instrumentation can be suitably adjusted by the resistor 40 to obtain the desired span adjustment on the dial 37. When the torque pickup is then returned from its calibrating position to its normal position on torque arm 6 it is seen that the torque wrench 1 may be accurately tested.

Without this improved relationship of using the same instrument in conjunction with the torque sensing element in either the testing position or the calibrating position an error would, of necessity, arise. However, with my arrangement this is not possible because the output of the torque sensing element 3 is set to a normal value for full scale load and the instrument is made to read the full scale equivalent to this. It will be understood that these two settings (the instrument input and the torque pickup ouput) can never be individually set or matched to identically the same value as a practical matter. However, when the torque pickup is put together with the instrument and the combined system (pickup plus instrument) is calibrated to read a known value at a known load, then any possible error due to mismatching is eliminated. Consequently, the ability to move the pickup to the calibration position while maintaining the measuring system intact provides an extremely effective operation for greatest reliability in a torque tester.

My combined system of torque tester pickup and instrument has the further advantage of allowing the use of multiple torque pickups of different load ranges thereby permitting one piece of apparatus to be used for torque wrenches having a wide range of capacities. To accomplish this a second torque pickup, diagrammatically indicated at 50, Fig. 6, is connected into a common supply circuit generally indicated at 51 in the form of a multiple tap transformer. With this common supply each pickup is continuously kept warm so that either may be quickly placed in service without any lost time for a warm-up period. The pickups can be selectively connected to the common instrumentation by a double throw switch 66 and in order that this common instrumentation 35—39 may be used with maximum calibrating accuracy, I provide for the pickup 50 a second calibrating resistor 52 which may be connected into the common instrumentation by a switch 53 engaging a contact 54 and at the same time disconnecting the calibrating resistor 40 without in any way impairing the calibration between the torque pickup 34 and the instrumentation. Thus it is possible to independently calibrate two torque pickups with their different torque ranges and to maintain such calibration with maximum effectiveness when the torque pickups are placed in use. It will be understood that whichever torque pickup is not in use it is stored within any suitable space of the tester cabinet.

Figure 1:
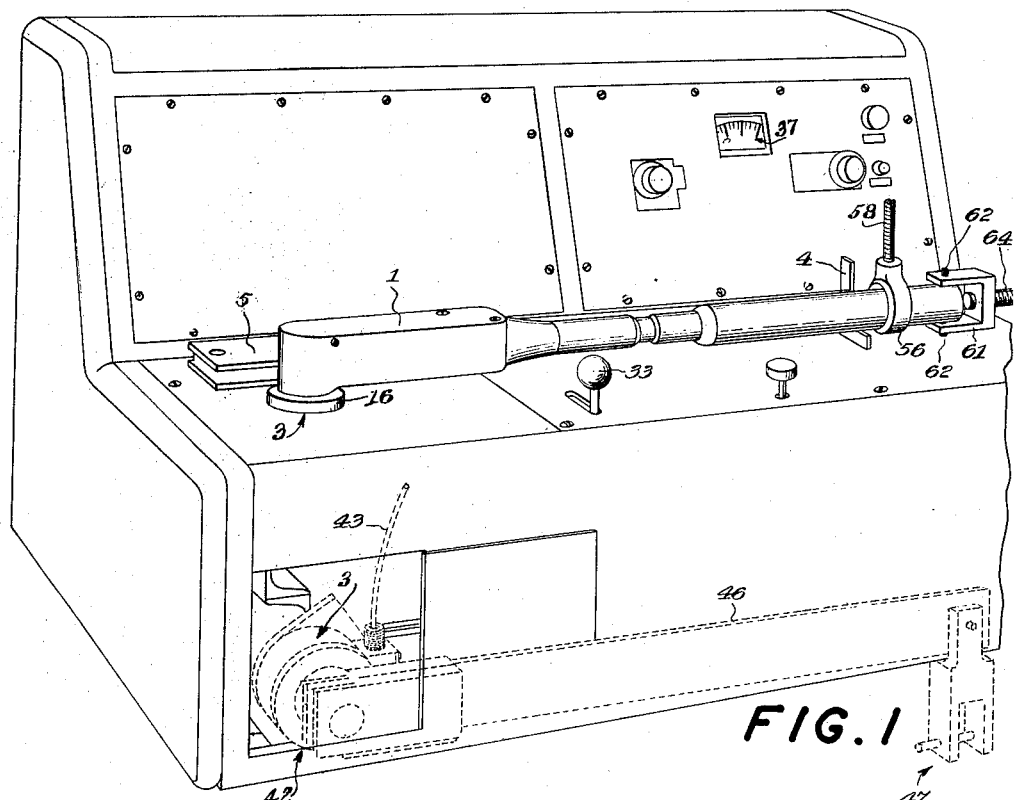
Fig. 1 is a perspective of the exterior of my improved tester showing a wrench in its testing position and also showing in dotted lines the position of the torque sensing pickup calibrating means.

One of the difficulties of torque wrench testers has been the inability to know whether the accuracy of the wrench is affected if a mechanic does not pull on the handle in a direction normal to its axis and in the plane of rotation. For instance, a mechanic may pull in a direction partially upward or partially axially of the handle, or both, thereby producing only a component of torsional effort on the wrench and on the pickup. The force mentioned as a partially upward one broadly includes a lateral force in any abnormal direction about the wrench handle axis. Reference to the axial force also broadly includes a force in any direction that produces an abnormal axial component. To determine the accuracy of a torque wrench under predetermined abnormal lateral or axial forces, I have provided means for exerting measurable amounts of such forces on the wrench handle during testing of the wrench. For instance, as shown in Fig. 1, an abnormal lateral force applying means comprises a ring 56 encircling the wrench handle and which, as shown in Fig. 8, is connected to a force measuring cantilever bending beam 57 by a rotatable shaft 58 having a right hand threaded connection with ring 56 and a left hand connection with beam 57. The fixed end of the beam is suitably mounted on any stationary support generally indicated at 59. Upon rotation of shaft 58 the beam and ring 56 will be pulled toward each other so that the ring pulls upwardly on the wrench handle until a desired load is produced as indicated by any suitable means to measure the deflection of the beam 57. The deflection measuring means may be any suitable type but for purposes of illustration herein it is shown as a dial indicator 60. Similarly, an abnormal axial force is applied to the wrench handle by any suitable gripping means diagrammatically illustrated at 61 which has set screws 62 engaging the opposite sides of the handle. This axial grip is connected to another force measuring beam 63 by a right and left hand threaded shaft 64 whereby upon rotation of such shaft the grip 61 and beam 63 are pulled toward each other until a desired load is obtained as indicated by suitable means for measuring the deflection of the beam such as a dial indicator 65. A torque is applied to the wrench handle and then known abnormal lateral and axial forces may be applied to the wrench handle to determine their effect on the accuracy of the wrench. It will be noted that the beams 57 and 63 are each, in effect, composed of two beams operating as a parallelogram whereby the axis of the nut remains parallel to the axis of the screws 58 and 64.

From the foregoing disclosure it is seen that I have provided a torque wrench tester that is highly effective for testing a torque wrench and of insuring a high degree of calibrated accuracy of the tester. It is to be noted in particular that the torque responsive means is wholly independent of any friction in bearings 8 and 9 by reason of the torsional effort from arm 6 being transmitted directly to the pickup which is mounted on the arm and thence directly through the pickup to the wrench. My improved system is such that torque pickups of different ranges can be quickly selectively used with the same high degree of accuracy for each. Also the tester is sufficiently compact that it may be readily placed upon a bench without requiring excessive space. While my invention has been specifically disclosed as a torque wrench tester, yet in its broad aspects it is a torsion testing machine.

It will, of course, be understood that various changes in details of construction and arrangement of parts may be made by those skilled in the art without departing

I claim:

1. A tester for a torque wrench having socket and handle portions comprising, in combination, a torque arm, means for pivotally supporting one end thereof for angular movement about an axis, means for applying a torsional force to the arm, torque responsive means having opposite ends that are relatively angularly movable in response to torsion, means for supporting one of said ends by said arm so as to rotate therewith about an axis substantially coaxial with the torque arm axis, means whereby the socket portion of a torque wrench may be held in a connected position with the other end of said torque responsive means, and means whereby the wrench handle may be held in a fixed position so that the wrench may be tested by applying a torsional load to said arm and thence to the torque responsive means and torque wrench.

2. The combination set forth in claim 1 further characterized by the provision of means for removably supporting the torque responsive means on said arm whereby upon removal of the torque responsive means the torque arm remains in its pivotally supported position so as to allow another torque responsive means of different capacity to be used for testing.

3. The combination set forth in claim 1 further characterized in that the torque arm and torque responsive means have complementary elements so as to locate the torque responsive means for rotation about the pivotal axis of the torque arm.

4. A torque wrench tester having socket and handle portions comprising, in combination, a torque arm, means for applying a torsional force to such arm, means for pivotally supporting one end of the torque arm including a locator shaft having a bore coaxial with the axis of rotation of the torque arm, torque responsive means having a pin removably receivable in said bore so as to locate said torque responsive means for rotation about the torque arm axis, means for connecting the torque responsive means to the torque arm for rotation therewith, means for connecting the socket portion of a torque wrench to the torque responsive means, and means for holding the handle portion of the wrench in a fixed position so that the wrench may be tested by applying a torsional load to the torque responsive means through said torque arm.

5. A torque wrench tester having socket and handle portions comprising, in combination, a torque arm, means for applying a torsional force to such arm, means for pivotally supporting one end of the torque arm including a locator shaft having a bore coaxial with the axis of rotation of the torque arm, torque responsive means having a locator pin removably receivable in said bore so as to locate said torque responsive means for rotation about the torque arm axis, said torque responsive means and arm having a torque transmitting pin and a complementary recess therefor so as to transmit torque from the arm to the torque responsive means during testing of a wrench, means for connecting the socket portion of a torque wrench to the torque responsive means, and means for holding the handle portion of the wrench in a fixed position so that the wrench may be tested by applying a torsional load to the torque responsive means through said torque arm.

6. A torque wrench tester comprising, in combination, a torque arm, means for pivotally supporting one end thereof about a substantially vertical axis, means for applying a torsional force to the arm, torque responsive means connectable to a wrench to be tested and supported by said arm so as to rotate therewith about an axis substantially coaxial with the torque arm axis and being removable from the arm, means connected to said torque responsive means to indicate a torsional load applied to a wrench and having a fixed position relative to said arm; means for supporting the torque responsive means, after being removed from said torque arm, about a substantially horizontal axis while maintaining said connection between the torque responsive means and the indicating means in its said fixed position; and means for applying a dead weight to obtain a known moment to said torque responsive means about its horizontal axis thereby to calibrate the torque responsive means in conjunction with its connection to the indicating means that exists during testing of a wrench.

7. The combination set forth in claim 6 further characterized in that the torque responsive means has electrical strain gages responsive to torsional strains induced by testing of a wrench, and the indicating means includes an electrical circuit connected to the strain gages, said electrical circuit connection with the strain gages remaining continuous at all times regardless of whether a calibration or testing operation is being performed.

8. A torque wrench tester comprising, in combination, torque responsive means connectable to a torque wrench to be tested in a given plane in which the wrench normally rotates, means for applying a torsional force to the torque responsive means in the direction of such plane, means for measuring the applied torque, means for applying simultaneously with the torsional force a lateral force to the torque wrench in a direction different from that of the applied torque thereby to determine the effect on the accuracy of the wrench of an abnormal lateral force, and means for measuring such lateral force.

9. A torque wrench tester comprising, in combination, torque responsive means connectable to a torque wrench to be tested in a given plane in which the wrench normally rotates, means for applying a torsional force to the torque responsive means in the direction of such plane, means for measuring the applied torque, means for applying simultaneously with the torsional force a known force axially of the torque wrench handle so as to determine the effect on the accuracy of the torque wrench by an abnormal axial force applied thereto and means for measuring such axial force.

10. Testing apparatus comprising, in combination, a first torque responsive means of a given range capacity and having relatively rotatable portions one of which is engageable with a member to be tested, a second torque responsive means of a range capacity different from the first torque responsive means and also having relatively rotatable portions one of which can be connected to a member to be tested, means for selectively detachably supporting the other portion of either of said torque responsive means depending upon the torque capacity desired for a given test, means for imposing torsion between the test member and the supported portion of the selected torque responsive means, and means continuously connected at all times to both of said torque responsive means so that regardless of which torque responsive means is in the the normal test position an indication is obtained when a predetermined torque is applied to the test member, thereby maintaining each torque responsive means and indicating means as a unitary system at all times so that it can be calibrated as a unitary system.

References Cited in the file of this patent

UNITED STATES PATENTS

| | | |
|---|---|---|
| 2,648,219 | Emery | Aug. 11, 1953 |
| 2,703,976 | Livermont | Mar. 15, 1955 |
| 2,705,416 | Thomas | Apr. 5, 1955 |
| 2,720,111 | Clark | Oct. 11, 1955 |
| 2,768,526 | Trimble et al. | Oct. 30, 1956 |
| 2,795,131 | Booth | June 11, 1957 |